United States Patent
Carper et al.

(10) Patent No.: US 9,514,504 B2
(45) Date of Patent: Dec. 6, 2016

(54) ENCODING/DECODING MESSAGE BY SELECTIVELY ADJUSTING CHARACTERISTICS OF SUB-UNITS IN IMAGE DATA

(71) Applicant: TEC SOLUTIONS, INC., Burlingame, CA (US)

(72) Inventors: Todd Alan Carper, Burlingame, CA (US); Hampton Miller, Corvallis, OR (US)

(73) Assignee: TEC SOLUTIONS, INC., Burlingame, CA (US)

( * ) Notice: Subject to any disclaimer, the term of this patent is extended or adjusted under 35 U.S.C. 154(b) by 41 days.

(21) Appl. No.: 14/312,382

(22) Filed: Jun. 23, 2014

(65) Prior Publication Data

US 2015/0003668 A1 Jan. 1, 2015

Related U.S. Application Data

(60) Provisional application No. 61/840,708, filed on Jun. 28, 2013.

(51) Int. Cl.
*G06K 9/00* (2006.01)
*G06T 1/00* (2006.01)

(52) U.S. Cl.
CPC ..... *G06T 1/0028* (2013.01); *G06T 2201/0051* (2013.01); *G06T 2201/0061* (2013.01); *G06T 2201/0081* (2013.01)

(58) Field of Classification Search
None
See application file for complete search history.

(56) References Cited

U.S. PATENT DOCUMENTS

| 6,049,627 A * | 4/2000 | Becker | G06T 1/005 382/181 |
| 6,256,398 B1 * | 7/2001 | Chang | G06K 7/14 382/100 |
| 6,381,341 B1 * | 4/2002 | Rhoads | G06K 9/00442 382/100 |
| 7,120,273 B2 * | 10/2006 | Robins | G06T 1/0071 382/100 |
| 7,769,197 B2 * | 8/2010 | Fujii | G06T 1/0028 380/54 |
| 2015/0003668 A1 * | 1/2015 | Carper | G06T 1/0028 382/100 |

* cited by examiner

*Primary Examiner* — Tahmina Ansari
(74) *Attorney, Agent, or Firm* — Volentine & Whitt, PLLC

(57) ABSTRACT

A message can be encoded in an image file by mapping at least one bit of the message onto each sub-unit of the image file, and adjusting a distinguishable characteristic of each sub-unit according to the corresponding bit to produce a modified image file. The message can be decoded from the message file by comparing each sub-unit of the modified image file with a corresponding sub-unit of the original image file, and identifying at least one bit of the message based on each comparison.

23 Claims, 6 Drawing Sheets

ENCODING/DECODING MESSAGE BY SELECTIVELY ADJUSTING CHARACTERISTICS OF SUB-UNITS IN IMAGE DATA

CROSS-REFERENCE TO RELATED APPLICATION

This application claims priority under 35 U.S.C. §119(e) to U.S. Provisional Patent Application No. 61/840,708 filed on Jun. 28, 2013, the subject matter of which is hereby incorporated by reference.

BACKGROUND

Images and other forms of media are often accompanied by messages such as marking information in the form of a copyright or ownership notice, or reference information in the form of a uniform resource locator (URL). Such messages may be used, for instance, to prevent unauthorized use or distribution of the media, or to enhance a user's experience in connection with the media.

One common form of message is a visible watermark embedded in an image. A visible watermark, however, has significant drawbacks, as it may be distracting and obtrusive. An alternative, less obtrusive way of providing a message is by inserting it into an image file name or in metadata associated with an image. This approach also has significant drawbacks, however, since the message may be modified or lost through alteration of the image file name or metadata. For example, the message may be modified or lost when a system performs a memory size reduction operation by eliminating information that does not influence the actual rendering of the image for viewing.

In view of at least the above shortcomings of conventional approaches, there is a general need to provide messages in a form that is not distracting or obtrusive, yet is not easily removed or altered and can also be readily detected by programmatic means, e.g., without resorting to cumbersome detection mechanisms such as optical character recognition.

SUMMARY

In one embodiment of the inventive concept, a method comprises identifying multiple sub-units of an original image file, each of the sub-units comprising multiple pixels, mapping a message onto the original image file by mapping at least one bit of the message onto each of the sub-units, and selectively adjusting a distinguishable characteristic of each sub-unit according to the corresponding at least one bit to produce an adjusted image file. The adjusting of a distinguishable characteristic may comprise, for instance, increasing or decreasing the average brightness of each sub-unit in relation to an average brightness of the original image file where the corresponding at least one bit has a first value (e.g., logical "1"), and maintaining the average brightness at a current level where the corresponding at least one bit has a second value (e.g., logical "0"). The method may further comprise storing the original image file and subsequently retrieving the message by comparing the original image file to the adjusted image file.

In another embodiment of the inventive concept, a method comprises identifying multiple sub-units of an adjusted image file, each of the sub-units comprising multiple pixels having a distinguishable characteristic, comparing the distinguishable characteristic of each sub-unit of the adjusted image file to a corresponding parameter of a corresponding sub-unit of an original image file, and identifying a message based on the comparison. In certain embodiments, identifying the message based on the comparison comprises detecting a bit with a first value (e.g., logical "1") upon determining that the distinguishable characteristic has the same value in a sub-unit of the adjusted image file and in a corresponding sub-unit of the original image file, and detecting the bit with a second value (e.g., logical "0") upon determining that the distinguishable characteristic has a different value in the sub-unit of the adjusted image file and in the corresponding sub-unit of the original image file.

BRIEF DESCRIPTION OF THE DRAWINGS

The drawings illustrate selected embodiments of the inventive concept. In the drawings, like reference numbers indicate like features.

DESCRIPTION

Embodiments of the inventive concept are described below with reference to the accompanying drawings. These embodiments are presented as teaching examples and should not be construed to limit the scope of the inventive concept.

The described embodiments relate generally to techniques for encoding or decoding messages in images and other forms of media. These techniques can be used, e.g., to store and later retrieve a message using an image file as the storage medium. The messages may comprise, for instance, marking information such as a copyright or ownership notice, or reference information such as a URL, although they are not limited to these examples. For explanation purposes, it will be assumed that a message is formed by a series of binary digits ("bits"), although the described concepts are not limited to messages formed by bits. Also, certain embodiments will be described in relation to images, although the described concepts can be readily applied in other contexts, as will be appreciated by those skilled in the art.

In certain embodiments described below, a message is encoded in an original image file by identifying multiple sub-units of the original image file, each of the sub-units comprising multiple pixels, mapping a message onto the original image file by mapping at least one bit of the message onto each of the sub-units, and adjusting a distinguishable characteristic of each sub-unit according to the corresponding at least one bit to produce an adjusted image file. In certain other embodiments described below, a message is decoded from a modified image file by identifying multiple sub-units of an image file, each of the sub-units comprising multiple pixels having a distinguishable characteristic, comparing the distinguishable characteristic of each sub-unit of the image file to a corresponding parameter of a corresponding sub-unit of an original image file, and identifying a message based on the comparison.

Figure 1:
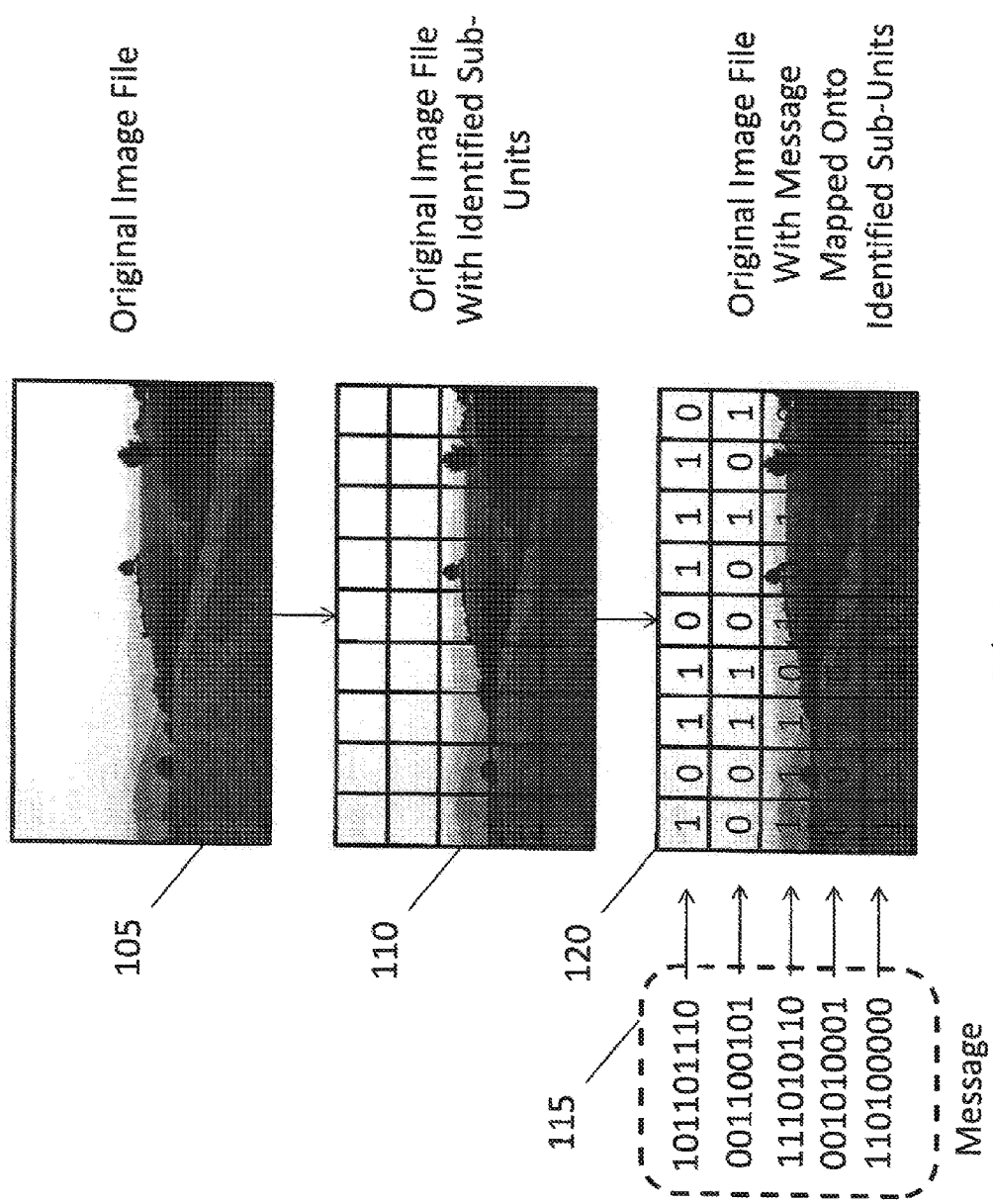
FIG. 1 is a conceptual diagram illustrating a method of encoding a message in an image file according to an embodiment of the inventive concept.
Figure 2:
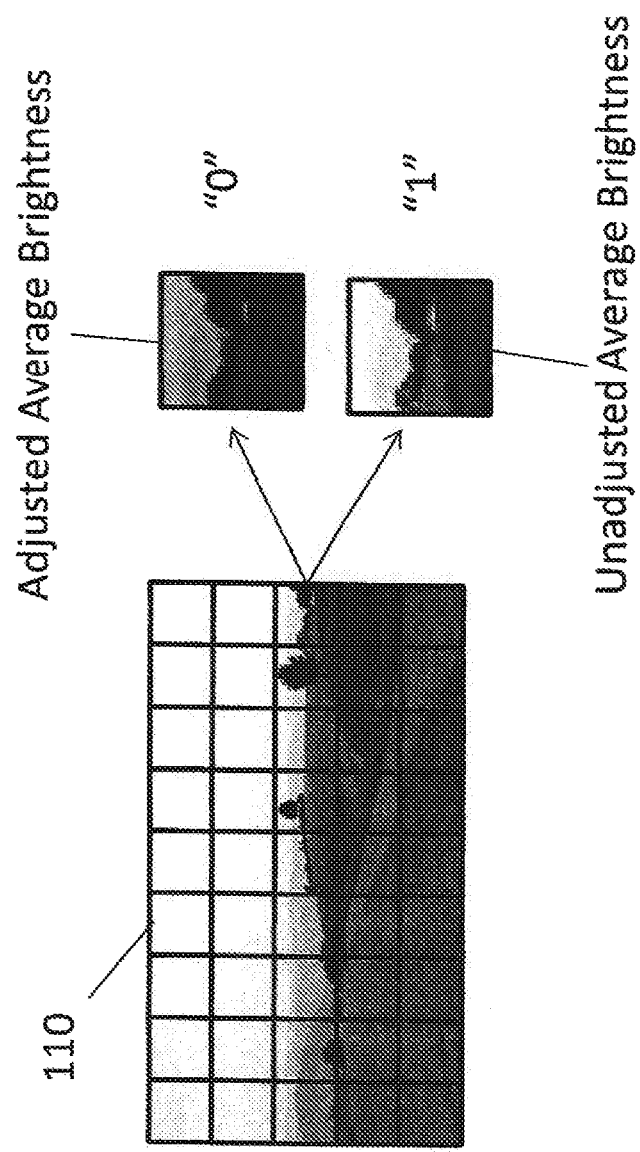
FIG. 2 is a conceptual diagram illustrating the encoding of a single bit of data in a sub-unit of an image according to an embodiment of the inventive concept.
Figure 3:
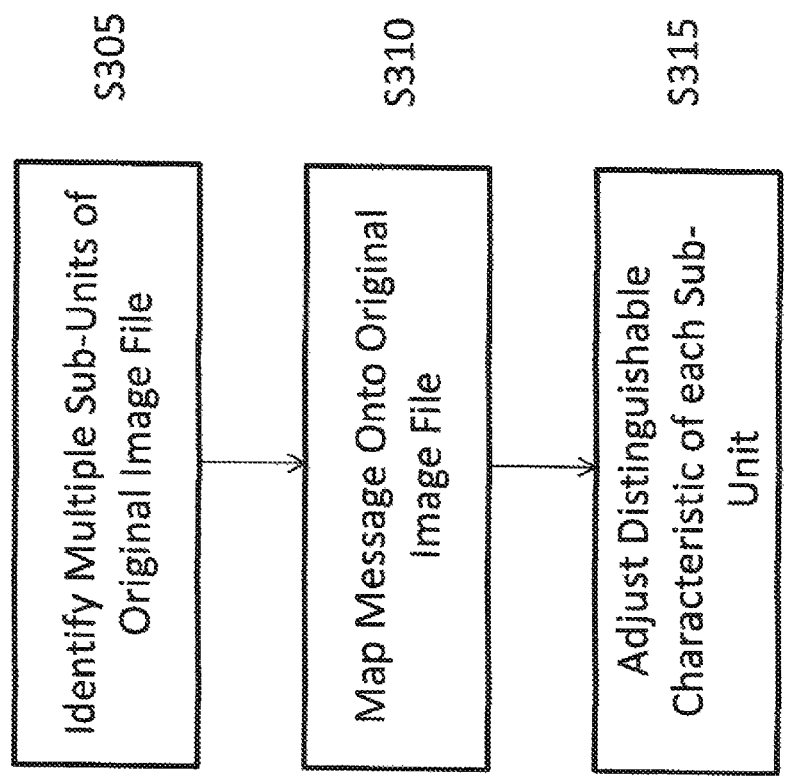
FIG. 3 is a flowchart illustrating a method of encoding a message in an image file according to an embodiment of the inventive concept.

FIGS. 1 through 3 illustrate the encoding of a message in an image file according to an embodiment of the inventive concept. In particular, FIG. 1 is a conceptual diagram illustrating a method of encoding a message in an image file according to an embodiment of the inventive concept, FIG. 2 is a conceptual diagram illustrating the encoding of a single bit of data in a sub-unit of an image according to an embodiment of the inventive concept, and FIG. 3 is a flowchart illustrating a method of encoding a message in an image file according to an embodiment of the inventive concept.

Referring to FIGS. 1 through 3, the method begins by identifying multiple sub-units of an original image 105 (S305). The sub-units are illustrated conceptually by a grid overlaying a copy 110 of the original image. Although the sub-units are shown as square sections of original image 105, they may take an arbitrary form.

Next, the method maps a message 115 onto the original image file (S310). This mapping may comprise, for instance, assigning a correspondence between each bit of the message and each of the sub-units. Finally, the method modifies each of the sub-units to encode a bit of data from message 115, resulting in a modified image 120 (S310).

In FIG. 1, the image modification is illustrated conceptually by overlaying the bits on top of the image, although the actual image modification is generally accomplished by modifying one or more discernible characteristics of each sub-unit without any conspicuously marking. For instance, as shown in FIG. 2, one way to encode information on a sub-unit is to adjust the average brightness of a selected sub-unit. In the illustrated example, the average brightness is decreased to encode a "0", and it is unchanged to encode a "1". Alternatively, the average brightness could be increased or unchanged to encode a "0", and the average brightness could be increased or decreased to encode a "1". In FIG. 2, the decrease in image brightness is exaggerated for clarity, but this is not to be construed as an indication that the modification of a "distinguishable characteristic" is necessarily a modification discernible by simple observation. Rather, the modification of a distinguishable characteristic may be one that is discernible by any reasonable mode of detection, typically through electronic data analysis.

In some embodiments, the method of FIG. 1 is performed in conjunction with JPEG image compression. In general, JPEG image compression comprises (1) dividing an image into pixel sub-units (e.g., 8×8 pixel sub-units), and (2) replacing each sub-unit by its mathematical equivalent with higher frequency, lower amplitude features removed. This results in a reduction in the amount of memory required to store the image at the cost of some loss of fine detail while keeping the "general appearance" and dimensions of the image unchanged. For example, one aspect of the "general appearance" of an image that is largely unchanged by the JPEG image compression process is the average light intensity or brightness.

To store a desired message in conjunction with JPEG encoding, the method of FIG. 1 may use known operational characteristics of the JPEG encoding standard to create a modified image by copying the original image and then (1) mapping each message bit to a corresponding image sub-unit, and (2) if the value of the associated message bit is "0" (or alternatively "1"), adjusting the average brightness for the sub-unit in the new image. Otherwise, the sub-unit information is copied unchanged.

In certain embodiments, where the brightness has been determined to require adjustment, it is changed in a direction of the overall average brightness of the entire image. Thus, a dim sub-unit may become brighter while a bright sub-unit becomes dimmer. In this way, the message data is not directly encoded into the image data but rather as the change in brightness of selected sub-units. An image prepared in such a way may retain the encoded message across multiple renderings and recompressing of the image data. In general, the magnitude of the modulation can be determined experimentally, and may be, for instance, about twice the average noise level.

Figure 4:
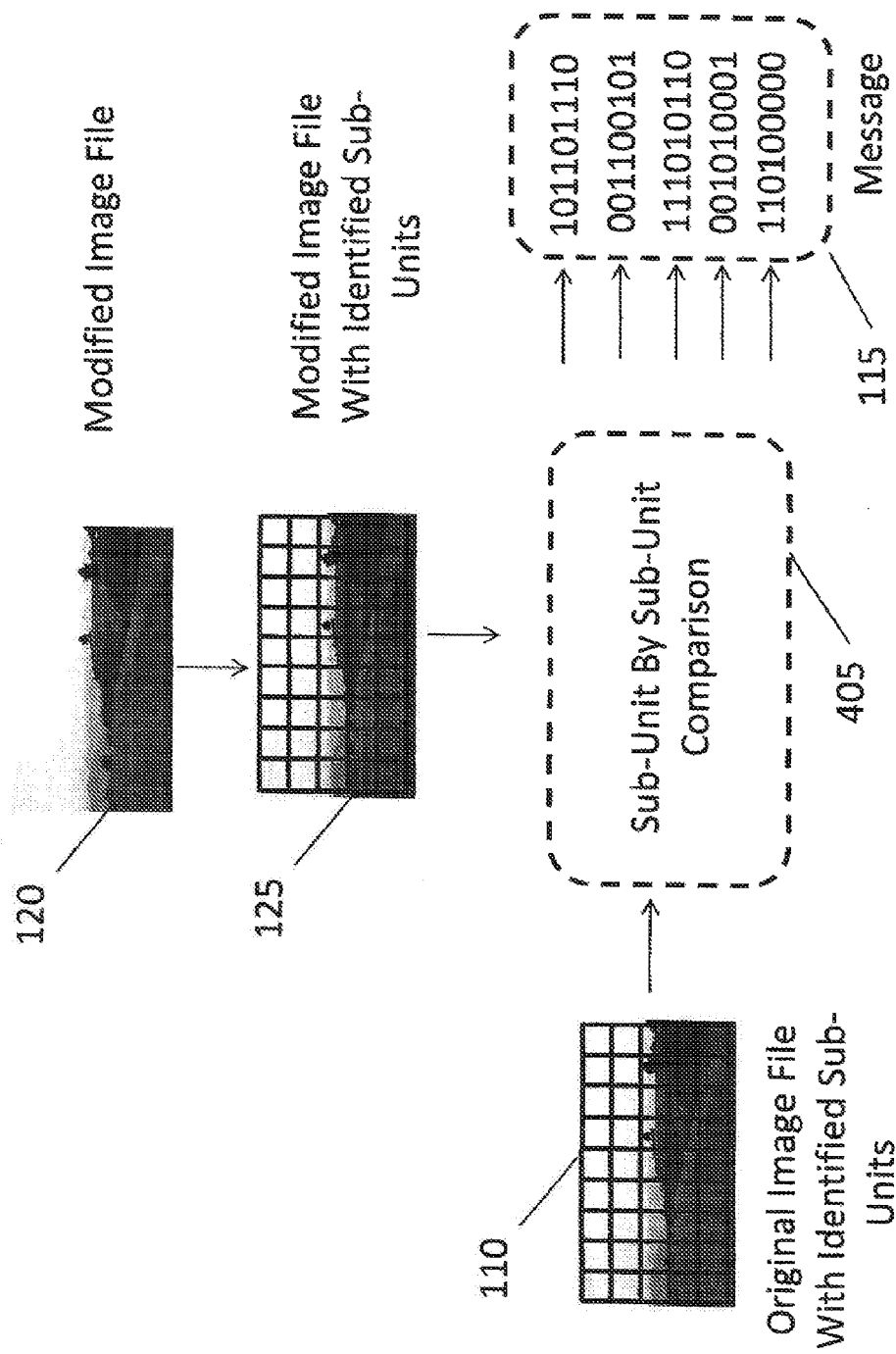
FIG. 4 is a conceptual diagram illustrating a method of decoding a message in an image file according to an embodiment of the inventive concept.
Figure 5:
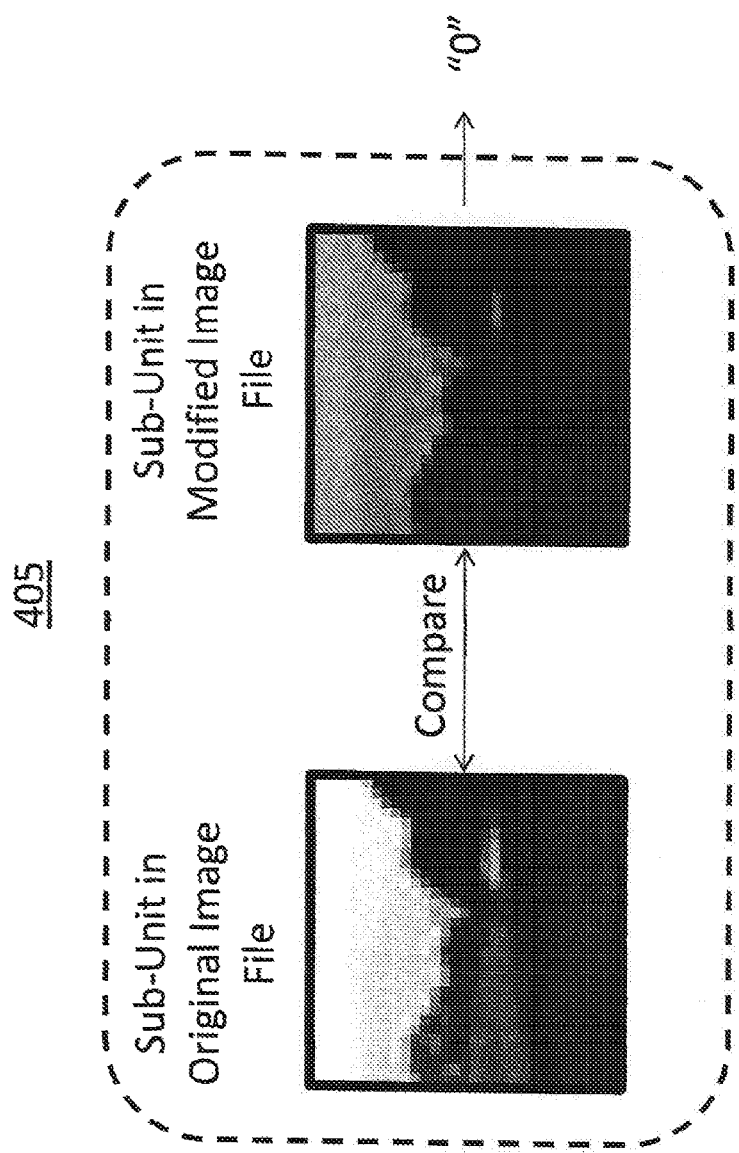
FIG. 5 is a conceptual diagram illustrating a comparison between a sub-unit of an original image and a sub-unit of a modified image in the method of FIG. 4.
Figure 6:
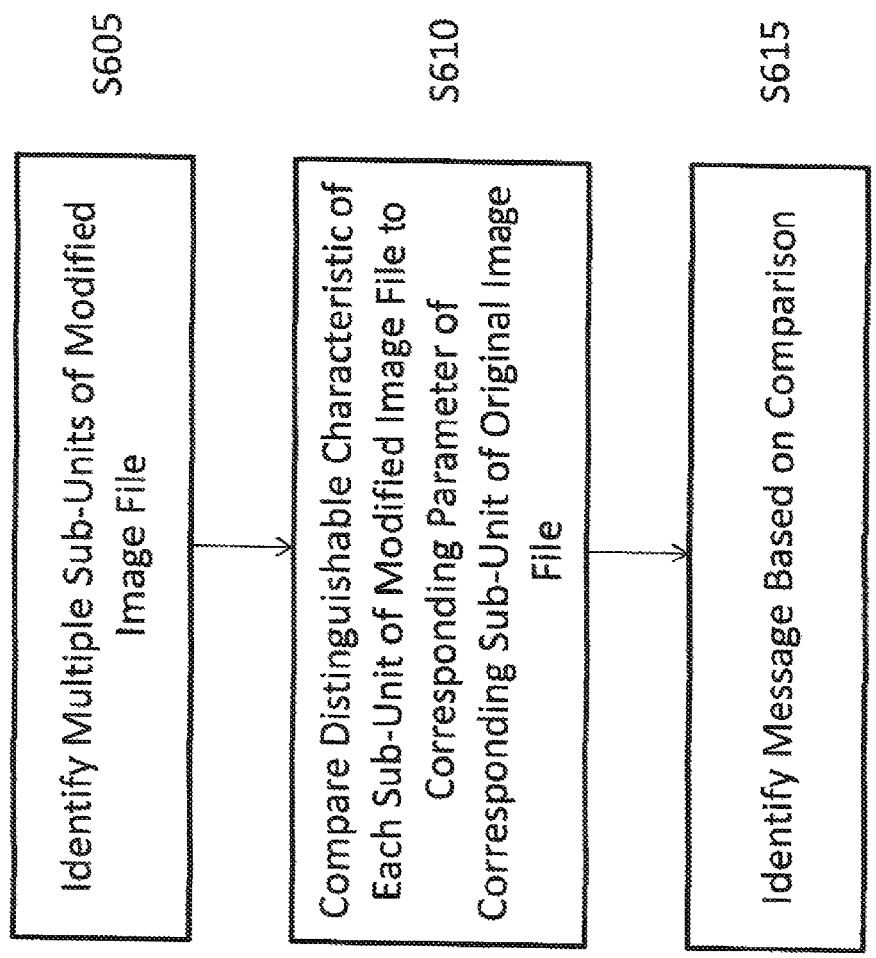
FIG. 6 is a flowchart illustrating a method of decoding a message in an image file according to an embodiment of the inventive concept.

FIGS. 4 through 6 illustrate the decoding of a message in an image file according to an embodiment of the inventive concept. In particular, FIG. 4 is a conceptual diagram illustrating a method of decoding a message in an image file according to an embodiment of the inventive concept, FIG. 5 is a conceptual diagram illustrating a comparison between a sub-unit of an original image and a sub-unit of a modified image in the method of FIG. 4, and FIG. 6 is a flowchart illustrating a method of decoding a message in an image file according to an embodiment of the inventive concept.

Referring to FIGS. 4 through 6, the method begins by identifying multiple sub-units 125 of modified image file 120, each of the sub-units 125 comprising multiple pixels having a distinguishable characteristic (S605), comparing the distinguishable characteristic of each sub-unit of modified image file 120 to a corresponding parameter of a corresponding sub-unit of original image file 110 (S610), and identifying the message based on the comparison (S615).

As illustrated in FIGS. 4 and 5, the comparison of a distinguishable characteristic may be performed by a comparison module 405. The comparison may comprise, for example, comparing the average brightness of a sub-unit of original image file 110 with the average brightness of a corresponding sub-unit of modified image file 120, and decoding a "0" where the average brightness is different, and otherwise decoding a "1". Alternatively, a "1" could be decoded where the average brightness is different, and a "0" could be decoded otherwise. In other embodiments, a different characteristic could be compared, such as a value of a specific group of pixels, frequency content, maximum or minimum brightness, or any of several other distinguishable characteristics.

In some embodiments, the method of FIGS. 4 through 6 relies on published inherent operational characteristics of the JPEG encoding standard to compare modified image information to original image information. In such embodiments, the method may map each image sub-unit of JPEG compression to a message bit, and perform the comparison based on those sub-units. As indicated above, certain distinguishable characteristics, such as the average brightness of a sub-unit, is substantially invariant with respect to JPEG encoding and decoding, so it may be beneficial to encode and decode the message based on the modification of such characteristics.

The above-described methods have many potential applications, which include at least the following.

In a first application, the encoding of a message is used to embed copyright, authorship, or ownership in an image file. Suppose, for instance, a user desires to upload copyrighted images to the internet and have a mechanism that can aid in determining if a similar looking image is actually the posted image. Commonly, author or copyright information is included in a comment area of the image file definition, but a shortcoming of this technique is that many programs reduce the storage size of images by removing any information that is not actually part of the image, so the author information may be discarded as soon as it is stored on a remote server.

Using the method of FIGS. 1 through 3, an author's name can be encoded into an image file rather than attached to the image file. The encoded message may survive lossy (e.g., JPEG) or lossless compression of the image, and the encoded message may be difficult to remove or corrupt without making substantial alterations to the image. Thereafter, the author or owner of the original image could download a suspected copy image and then, using the original image as part of the process, as in the method of FIGS. 4 through 6, attempt to decode and thereby determine if the author's name is recovered.

In a second application, the encoding of a message is used to embed a reference to a primary image (e.g., a URL) within a secondary image, such as a smaller copy of the primary image. This may allow the primary image to be stored on a remote server and accessed by a number of users or sites upon demand. Where the primary image is large, uploading it to many locations may incur storage charges and be time consuming to perform, so a relatively small secondary image may be used as a place holder. For instance, suppose a high resolution image (e.g., a picture of a rose) is stored in a remote server, and a URL of the stored high resolution image is encoded in a lower resolution image having the same picture. The lower resolution image is then distributed to a number of users or systems, and the URL is decoded using the method of FIGS. 4 through 6. Once the URL is decoded, a user may download the original high resolution image using the URL. In general, the method could be executed automatically (e.g., by a browser) to download the image, or it could be executed in response to an express user command.

In some instances of the second application, the primary image may be stored in an encrypted form, and the encoded message may further comprise an identifier that specifies users or groups that are allowed to view the image. These users or groups may have a subscription or otherwise by authenticated to a key server that provides decryption keys depending on the groups to which the user belongs. Where the secondary image is decoded and the URL is extracted, the primary image could be obtained in an encrypted form. Then, if the user belongs to the group reference by the encoded group identifier, the user would have the key necessary to decrypt the primary image and display it.

In a third application, the methods of FIGS. 1 through 6 could be used similar to the second application, except that any type of encrypted file could be used rather than a primary image. Such an encrypted file could, for instance, a PDF, a Word document, a sound file, a movie, a movie clip, a database, a spreadsheet, or any other type of electronic document or file.

In a fourth application, an encrypted file is stored on a remote server, and a network location (e.g., URL) of the encrypted file is encoded into an image file using the method of FIGS. 1 through 3. Subsequently, the image file is stored in the same or another remote server where the encoded information survives lossless and lossy compression techniques such that the encoded information can subsequently be decoded from the image file and use to locate and based on access privileges decrypt the encrypted file.

In a fifth application, the method of FIGS. 1 through 3 is used to store a message (e.g., a URL) that identifies a remote location of a manifest file. The URL can be used to access the manifest file, and the manifest file can then be used to identify locations of files related to the original image file and stored on a remote server.

In certain embodiments of the above described methods, the message may be encoded in a compressed or reduced form, and then decompressed or expanded following decoding. For instance, a URL may be reduced before it is encoded in an image file, and then expanded after the decoding occurs.

As indicated by the foregoing, the described methods can be used to encode a message in an image file and to subsequently retrieve the message. These methods may provide the messages in a form that is less distracting or obtrusive compared to conventional approaches, yet is not easily removed or altered and can also be readily detected by programmatic means.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method, comprising:
    identifying multiple sub-units of an original image file, each of the sub-units comprising multiple pixels;
    mapping a message onto the original image file by mapping at least one bit of the message onto each of the sub-units;
    selectively adjusting a distinguishable characteristic of each sub-unit among the multiple sub-units according to the corresponding at least one bit to produce an adjusted image file; and
    storing the original image file and subsequently retrieving the message by comparing the stored original image file to the adjusted image file,
    wherein the distinguishable characteristic is average brightness, and
    wherein said selectively adjusting the distinguishable characteristic comprises increasing or decreasing the average brightness of sub-units in relation to an average brightness of the original image file where the corresponding at least one bit has a first value, and maintaining the average brightness of sub-units at a current level where the corresponding at least one bit has a second value.

2. The method of claim 1, wherein the first value is a logical "1" and the second value is a logical "0".

3. The method of claim 1, wherein the original image file is a JPEG image file, and each of the sub-units comprises an 8×8 block of pixel data of the JPEG image file.

4. The method of claim 1, wherein the message comprises copyright, ownership, or authorship information.

5. The method of claim 1, wherein the message comprises reference information indicating a remote location of the original image file or an image file derived from the original image file.

6. The method of claim 5, wherein the reference information comprises a uniform resource locator (URL).

7. The method of claim 1, wherein the original image file has a first storage size and the adjusted image file has a second storage size smaller than the first storage size.

8. The method of claim 1, wherein the original image file is a JPEG encoded file, and the method further comprises compressing a non-JPEG image file to produce the original image file.

9. The method of claim 1, wherein the message identifies a remote location of an encrypted copy of the original image file.

10. The method of claim 9, wherein the message further identifies users or groups that are authorized to access the encrypted copy of the original image file.

11. The method of claim 1, wherein the message identifies a remote location of a manifest file identifying a location of at least one file related to an encrypted copy of the original image file and stored on a remote server.

12. The method of claim 11, wherein the at least one file is not an image file.

13. The method of claim 1, wherein the message comprises compressed information.

14. The method of claim 13, wherein the compressed information is a compressed uniform resource locator (URL).

15. The method of claim 1, wherein said retrieving the message comprises:
    identifying multiple sub-units of the adjusted image file;
    comparing the distinguishable characteristic of each sub-unit of the adjusted image file to a corresponding parameter of a corresponding sub-unit of the stored original image file; and
    identifying the message based on the comparison.

16. A method, comprising:
    identifying multiple sub-units of an adjusted image file, each of the sub-units comprising multiple pixels having a distinguishable characteristic;
    comparing the distinguishable characteristic of each sub-unit among the multiple sub-units of the adjusted image file to a corresponding parameter of a corresponding sub-unit of an original image file; and
    identifying a message based on the comparison,
    wherein the distinguishable characteristic comprises an average brightness, and
    wherein said identifying the message based on the comparison comprises
    detecting a bit with a first value upon determining that the distinguishable characteristic has a same value in a sub-unit of the adjusted image file and in a corresponding sub-unit of the original image file, and
    detecting a bit with a second value upon determining that the distinguishable characteristic has a different value in the sub-unit of the adjusted image file and in the corresponding sub-unit of the original image file.

17. The method of claim 16, wherein the first value is a logical "1" and the second value is a logical "0".

18. The method of claim 16, wherein the original image file is a JPEG image file, and each of the sub-units comprises an 8×8 block of pixel data of the JPEG image file.

19. The method of claim 16, wherein the message comprises a uniform resource locator (URL) associated with the original image file.

20. The method of claim 16, wherein the original image file has a first storage size and the adjusted image file has a second storage size smaller than the first storage size.

21. The method of claim 16, further comprising identifying a remote location of an encrypted copy of the original image file based on the message.

22. The method of claim 21, wherein the message further identifies users or groups that are authorized to access the encrypted copy of the original image file.

23. The method of claim 16, wherein the message identifies a remote location of a manifest file identifying a location of at least one file related to the original image file and stored on a remote server.

* * * * *